May 30, 1961
C. H. W. KAHL
2,986,406
BOY'S WAGON WITH FRONT-WHEEL DRIVE
Filed April 7, 1959
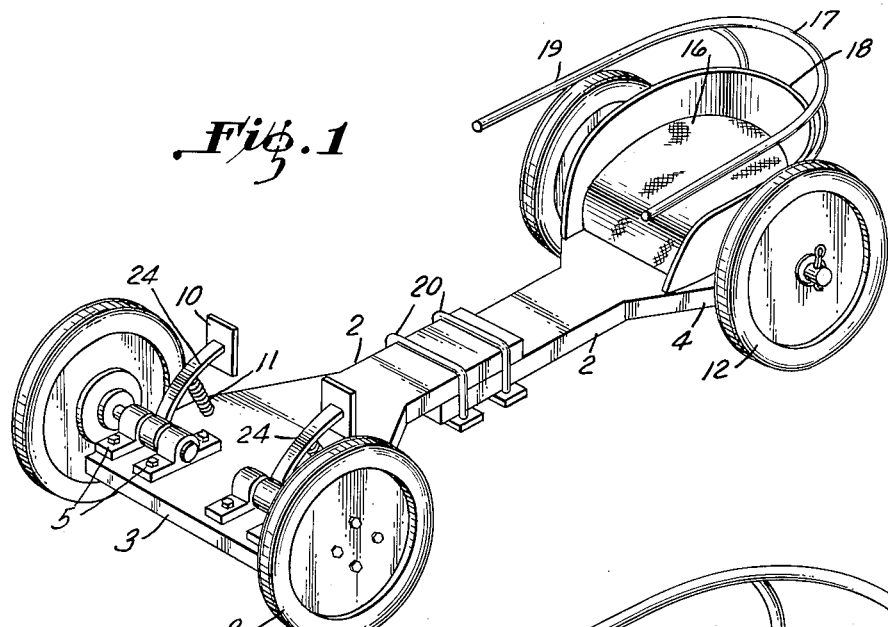
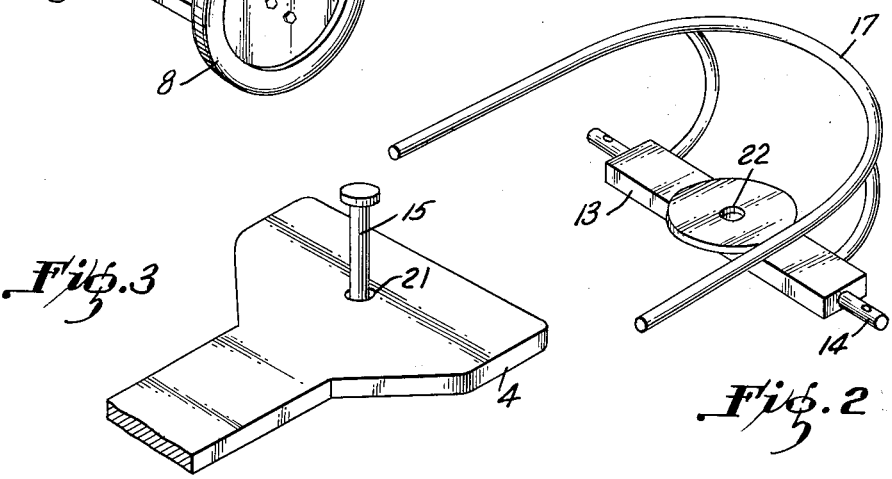
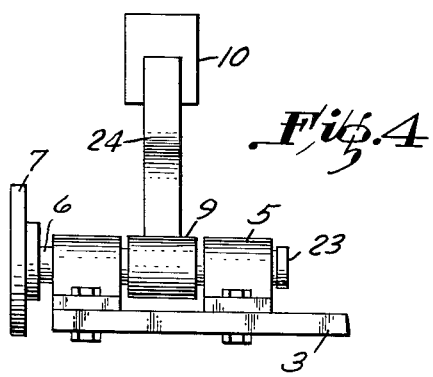
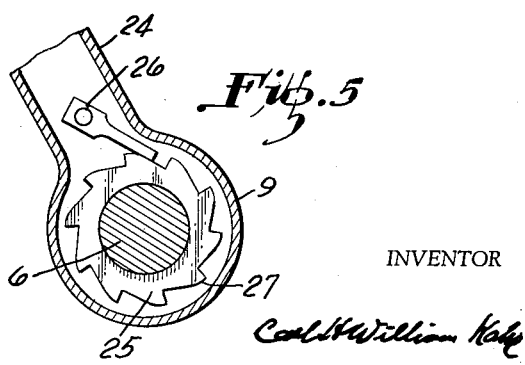
INVENTOR
Carl H William Kahl

United States Patent Office 2,986,406
Patented May 30, 1961

2,986,406
BOY'S WAGON WITH FRONT-WHEEL DRIVE
Carl H. William Kahl, 22 W. Cypress St., Phoenix, Ariz.
Filed Apr. 7, 1959, Ser. No. 804,723
1 Claim. (Cl. 280—253)

The object of this invention is to obtain a boy's four-wheeler with simple and direct drive upon its front-wheel axles.

Briefly stated, this is a stripped-down conveyance with a separate drive for each of the front wheels, by means of a ratchet-gear and foot lever combination; while the rear wheels are mounted on a pixotal axle tree, to which attaches a two-armed bracket for steering.

I attain my objects by the devices and construction illustrated in the accompanying drawings, in which—

Fig. 1 gives a perspective view of the assembled jalopy.

Fig. 2 gives a perspective view of the steering bracket, attached to the rear axle tree.

Fig. 3 shows a perspective view of the rear part of the reach.

Fig. 4 presents a plain view of a front axle, with the ratchet-foot lever combination upon it, and the axle bearings fastened to the front platform.

Fig. 5 provides a sectional plain view in crosscut of the lower part of the foot lever, with an outline of its housing which encloses the ratchet assembly.

Referring to the drawings, Fig. 1 gives a full view of the stripped-down jalopy, showing the adjustable reach, but no wagon box. The structure consists of a reach 2, which joins and supports a platform 3 at its front end, and a platform 4 at the rear. The reach 2 consists of two parts which are strapped together by U-clamps 20, so that the length of the vehicle can be altered.

At each side of the front platform 3, two bearings 5 are positioned, in which a front axle 6 turns. A steel flange 7 is attached to the outer end of each axle 6. A front wheel 8 is riveted or bolted to this flange 7, so that wheel 8 turns when axle 6 is forced to turn. The bearings 5 are mounted on the platform 3, two for the right wheel's axle 6 and two for the left wheel's.

A ratchet gear, combined with foot lever 24, is installed upon each axle 6, near the middle of it. Foot lever 24 has pedal 10 attached at the top. The lower part of foot lever 24 is shaped into a housing 9, which fits around axle 6, between the two bearings 5. Foot lever 24, together with housing 9, turns upon axle 6. A ratchet ring 25 is firmly mounted upon axle 6 under cover of housing 9. A pawl 26 is pivotally installed at the lower end of foot lever 24, within the housing 9. Pawl 26 is positioned above the ratchet ring 25, and is designed in length to engage cogs 27 of ratchet ring 25, so that axle 6 is compelled to turn when foot lever 24 is pushed forward.

To the inner end of axle 6, a small flange 23 is attached, which prevents axle 6 from shifting laterally.

As can be noted in Fig. 1, the front wheels 8 turn on separate axles 6 and are propelled by separate foot levers 24. This individual propulsion of axles makes up for the lack of a differential. For a turn to the right, the driver merely slows the right wheel, and for a turn to the left, he slows the left wheel.

A steel spring 11 is used for the pull-back of foot lever 24, one end of spring 11 being fastened to the rear of lever 24, and the other end to the platform 3, behind foot lever 24.

The rear platform 4 is superimposed upon an axle tree 13. A rigid axle 14 is affixed to each end of axle tree 13. The rear wheels 12 turn on axles 14.

A king bolt 15 is extended through a hole 21 in the platform 4, and through a hole 22 in the center of the axle tree 13, so that the axle tree 13, together with wheels 8, becomes pivotal beneath platform 4.

A bucket seat 16, with railing and back rest attachments 18, is superimposed over platform 4.

For the steering of the vehicle, a two-armed bracket 17 is attached to the rear of axle tree 13. Bracket 17 curves backward from the axle tree 13, then upwards above railing 18, where the bracket levels off and forms two handy arm rests 19, for the steering.

Since there is no wagon box to block the turning of the rear wheels, the size of the wheels 12 is not restricted.

I claim:

In a boy's pedal wagon with drive upon individual front axles, the combination with pivotal, guidable two rear wheels; a reach attached to a small platform positioned at the front thereof; a small platform attached to the rear of said reach; two short front axles, one mounted on the right side and one mounted on the left side of said front platform; two bearings mounted on the right side of said front platform, supporting the said right front axle; two bearings mounted on the left side of said platform, supporting the said left front axle; a flange affixed to the outer end of each of said front axles; a front wheel mounted upon each of the said flanges; a retaining flange affixed to the inner end of each of the said front axles; a foot lever installed upon each of said axles; the lower part of said foot lever shaped into a housing; said housing fitting and turning upon one of each of said axles; a ratchet ring affixed upon each of said axles, within the housing of said foot levers; a pawl pivotally installed near the bottom of each of said foot levers; said pawl, positioned within the said housing, above the said ratchet ring, being designed in length to engage the cogs of said ratchet ring and turn said axle when said foot lever is being pushed forward; one of the said two bearings of each front axle being positioned to the right of said foot lever housing, the other being positioned to the left of said foot lever housing; a pedal affixed to each of said foot levers, affording a direct and separate drive upon each of said front axles; a pivotal rear axle tree; two stationary axles, one at right and one at left, attached to said rear axle tree; said two rear wheels mounted for rotation upon said stationary axles; a king bolt extended downward through a hole in the center of said rear platform; said rear axle tree being pivotally joined beneath the said rear platform by the said king bolt extending downward through a hole in the center of the said axle tree; a bucket seat with a back rest, fastened upon said rear platform; and a two-armed bracket, fastened to the rear part of the said axle tree, curving backwards and upwards behind the said seat, then levelling off forwards with two arm rests, one positioned along each side of said bucket seat; the said bracket serving for the steering of the assembled wagon.

References Cited in the file of this patent

UNITED STATES PATENTS

| | | |
|---|---|---|
| 398,005 | Smith | Feb. 19, 1889 |
| 1,895,737 | Shaw | Jan. 31, 1933 |
| 2,067,712 | Knapp | Jan. 12, 1937 |
| 2,653,037 | Lassiter | Sept. 22, 1953 |